United States Patent Office 2,799,709
Patented July 16, 1957

2,799,709

PROCESS FOR THE MANUFACTURE OF A POLYENE DIALDEHYDE

Otto Isler, Marc Montavon, and Rudolf Rüegg, Basel, and Paul Zeller, Neuallschwil, Basel-Land, Switzerland, assignors to Hoffmann-La Roche Inc., Nutley, N. J., a corporation of New Jersey No Drawing. Application December 3, 1954, Serial No. 473,046

Claims priority, application Switzerland December 8, 1953

3 Claims. (Cl. 260—601)

The polyene dialdehyde 2,7-dimethyl-2,4,6-octatriene-1,8-dial—which will be called hereinafter $C_{10}$-dialdehyde—has been obtained heretofore by condensation of acetylene dimagnesium bromide with 2 mols of methacroleine, transposition of the 2,7-dimethyl-1,7-octadien-4-yne-(4)-3,6-diol obtained to 2,7-dimethyl-2,6-octadien-4-yne-1,8-diol, partial hydrogenation of the acetylene bond and subsequent oxidation, the sequence of the two last stages being reversible (Annalen der Chemie, volume 580 [1953], page 7, volume 583 [1953], page 100; Journal of the Chemical Society [1953], page 3294). The total yield is unsatisfactory and the process quite complicated.

According to the novel process of the invention, the $C_{10}$-dialdehyde may now be obtained easily and in good yield. This novel process comprises condensing a butenedial-diacetal, preferably a butenedial-lower alkyl acetal, in the presence of an acid condensing agent with a propenyl ether, preferably a propenyl-lower alkyl ether, and treating the 2,7-dimethyl-4-octene-3,6-diether-1,8-diacetal formed with an acid. The diether-diacetal is thereby hydrolysed and alcohol is split off from positions 2,3 and 6,7, thus producing the $C_{10}$-dialdehyde.

The $C_{10}$-dialdehyde is a valuable intermediate product in the synthesis of polyene dyestuffs. Thus, reacting the same according to Reformatsky with 2 mols of a γ-bromotiglic acid ester—in a manner analogous to the synthesis of dehydrocrocetin (Annalen der Chemie, volume 580 [1953], page 7)—and splitting off water leads directly to crocetin ester. On the other hand, acetalising the $C_{10}$-dialdehyde, condensing the acetal formed with 2 mols of a vinyl ether and treating the condensation product with acid will produce 4,9-dimethyl-2,4,6,8,10-dodecapentaene-1,12-dial which is an intermediate product in the synthesis of crocetin, bixin and lycopin.

The starting materials for the present process may be obtained according to known methods; for example maleic-dialdehyde-diacetals may be formed by catalytic partial reduction of acetylene dialdehyde-diacetals. In this manner, A. Wohl and E. Bernreuther (Annalen der Chemie, volume 481 [1930], page 10) have prepared maleic-dialdehyde-tetramethyldiacetal of boiling point 97.5°/11 mm. and a refractive index of $n_D^{20°}$ 1.43447. Maleic-dialdehyde-tetraethyldiacetal has been described by A. Wohl and M. Mylo (Rerichte der Deutschen Chemischen Gesellschaft, volume 45 [1912], page 339) and later by K. Henkel and F. Weygand (Berichte der Duetschen Chemischen Gessellschaft, volume 76 [1943], page 814); the latter indicate for this product a melting point of 18–19°. The acetal may be distilled in vacuo without decomposition (boiling point 128–130°/15 mm.) and represents a colorless oil of $n_D^{22°}$ 1.4315. The acetals of maleic-dialdehyde with higher alcohols, for example the tetrapropyl- or the tetrabutyldiacetals may be obtained in analogous manner.

Among the propenyl ethers required for the condensation, the ethyl propenyl ether is described in the literature (A. Kirrmann, Bulletin de la Société Chimique de France 6, [1939], page 841; M. G. Voronkov, Zhur Obshchei Khim 20, [1950], page 2060). The ethyl propenyl ether may best be obtained by pyrolysis of propionaldehyde-diethylacetal. The mixture thus obtained of the cis- and the trans-isomers of the compound formed is suitable for use in the condensation reaction; it boils at 68–72°/740 mm. and has a refractive index of $n_D^{26°}$ 1.3960. The homologues, for example the methyl propenyl ether of boiling point 45–47°/740 mm., $n_D^{23°}$ 1.3870, and the n-butyl propenyl ether of boiling point 120°, $n_D^{23°}$ 1.4100, may be prepared in a similar manner.

The first stage of the process according to the invention comprises the condensation of the butenedial-diacetal with a propenyl ether in the presence of an acidic condensation agent. Suitable condensation agents are for example borontrifluoride etherate, zinc chloride, titanium tetrachloride, aluminum chloride, tin tetrachloride, etc. In order to avoid side reactions, for example polymerisation and condensation of the $C_{10}$-diether-acetal formed with propenyl ether, it is recommendable to carry out the condensation at the lowest possible temperature. The most suitable reaction temperature is below 50°. In a preferred mode of operation, the propenyl ether is reacted with the diacetal at a temperature of 0–50° in a proportion of 2 mols to 1 mol. Thus, almost quantitative yields of substantially pure $C_{10}$-dietheracetals are obtained as colorless oils. These oils represent mixtures of stereoisomers; when using propenyl ethyl ether as starting material, one isomer may be separated in crystallized form upon cooling; after having been recrystallized in petroleum ether, the said isomer melts at about 70°. Before processing the oily products further, they need not be separated into the isomers or need not be distilled.

The second stage of the synthesis comprises hydrolysing the $C_{10}$-diether-acetals in acid medium, according to methods known per se, whereby alcohol is simultaneously split off from positions 2,3 and 6,7, so as to form the $C_{10}$-dialdehyde. This stage may suitably be carried out in the presence of water-soluble, non-volatile organic or inorganic acids, such as p-toluene sulphonic acid, oxalic acid, acetic acid, sulphuric acid, phosphoric acid, or of acidic water-soluble salts, such as zinc chloride and sodium hydrogen sulphate. It is recommendable to exclude oxygen during the reaction and to work in such a manner as to allow the alcohol produced to continuously distill off from the reaction mixture. In order to maintain the reaction mixture in a homogeneous state, it may be advisable to add a water-miscible solvent, such as dioxane, tetrahydrofurane, ethylene glycol dimethyl ether, etc. Preferably, the $C_{10}$-diether-acetal is heated to about 100° with aqueous phosphoric acid in the presence of a water-miscible solvent, the alcohol formed being continuously removed from the reaction mixture. Upon diluting the latter with water, the cristallised $C_{10}$-dialdehyde separates.

The hydrolysis may also be achieved by refluxing the $C_{10}$-diether-acetal with aqueous acetic acid for several hours, whereupon the mixture is diluted with water; the acetic acid may in this case already be added in a waterfree state prior to effecting the condensation reaction. All the double bonds of the $C_{10}$-dialdehyde obtained according to the invention have transconfiguration.

In order to avoid losses by polymerisation and decomposition, it is advisable not to let the reaction temperature go beyond 120° throughout the entire synthesis and, more particularly, not to distill the intermediate products, i. e. the $C_{10}$-diether-acetals.

*Example 1*

To 385 parts by weight of maleic dialdehyde tetraethylacetal is added 1 part by weight of anhydrous zinc chloride (or 0.5 part by volume of $BF_3$-etherate) and the mixture is heated to 30° C., while stirring. Thereafter, 375 parts by volume of ethyl propenylether are added dropwise, while continuously stirring. The speed of addition is regulated so as to keep the reaction temperature between 30 and 35° C. Once the addition of ethyl propenyl ether is completed, stirring is continued for a further ½ hour, the reaction mixture is diluted with ether and the catalyst is removed from the ether solution by means of sodium hydroxide. The ether solution is then dried, filtered and concentrated, thus leaving 660 parts by weight of crude $C_{10}$-diether-acetal. By distillation in high vacuo, pure 2,7-dimethyl-1,1,3,6,8,8-hexaethoxy-4-octene of boiling point 143° C./0.06 mm. and $n_D^{22°}$ 1.4395 is obtained. It represents a mixture of isomers. Upon standing, part of the distilled product crystallizes and melts after recrystallization from pertoleum ether at about 70° C.

The crude $C_{10}$-diether-acetal is mixed with 1300 parts by volume of dioxane, 130 parts of water and 53 parts by weight of 85% phosphoric acid and the mixture is heated to about 100° C. for 8 hours in a nitrogen atmosphere, a minute amount of hydroquinone being added as antioxidant. About 1000 parts by volume of a dioxane-water-alcohol mixture distill off, while the volume of the reaction solution is kept nearly constant by slow addition of a dioxane-water mixture (4:1). The still warm solution is then cautiously diluted with 1500 parts by volume of warm water, to precipitate 2,7-dimethyl-2,4,6-octatriene-1,8-dial in crystallized form. After cooling, the mixture is kept at 0° C. for several hours. The crystals are sucked off and dried in vacuo. Yield: about 200 parts by weight of melting point 158–160° C.

*Example 2*

50 parts by weight of $C_{10}$-diether-acetal (prepared according to Example 1 and purified by distillation) are mixed with 140 parts by volume of acetic acid, 20 parts by volume of ethyl acetate and 3 parts by volume of water and, after addition of a minute amount of hydroquinone, heated to 100° C. for about 30 hours. The ethyl acetate formed is removed in vacuo and the residue is poured on a mixture of ice and water. The precipitate is filtered off and recrystallized from methanol. 2,7-Dimethyl-2,4,6-octatriene-1,8-dial of melting point 158–160° C. is obtained.

*Example 3*

27 parts by weight of the crystallized $C_{10}$-diether-acetalisomer of melting point 70° C. (obtained in accordance with Example 1) are treated with phosphoric acid and aqueous dioxan as described in Example 1. Pure dimethyl-2,4,6-octatriene-1,8-dial of melting point 158–160° C. is obtained.

We claim:
1. Process for the manufacture of a polyenedialdehyde, which comprises condensing one molar proportion of a 2-butene-1,4-dial-diacetal in the presence of an acidic condensation agent and at a temperature below 50° C. with two molar proportions of a propenyl ether and treating the 2,7 - dimethyl - 4 - octene-3,6-diether-1,8-diacetal formed with an acid to produce 2,7-dimethyl-2,4,6-octatriene-1,8-dial.
2. 2,7-Dimethyl-4-octene-3,6-diether-1,8-diacetal.
3. 2,7-Dimethyl-1,1,3,6,8,8-hexaethoxy-4-octene.

References Cited in the file of this patent

UNITED STATES PATENTS 2,502,433      Copenhaver _____ Apr. 4, 1950